HENRY SHEARS.
Improvement in Water Wheels.
No. 119,477
Patented Oct. 3, 1871.
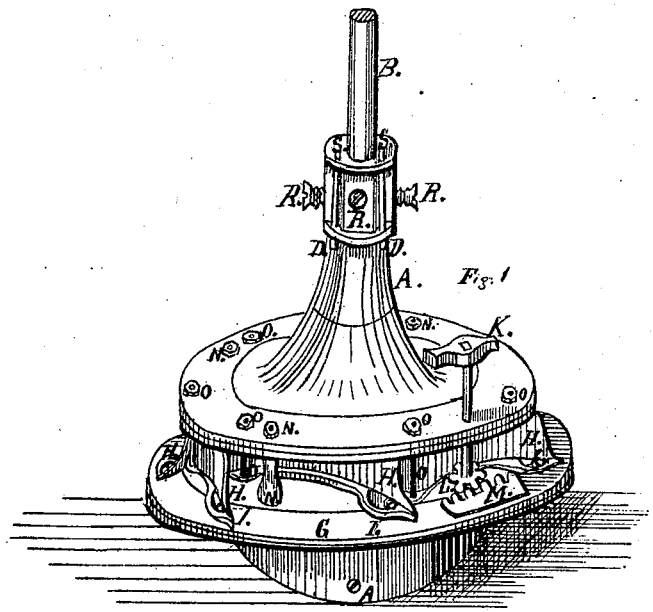
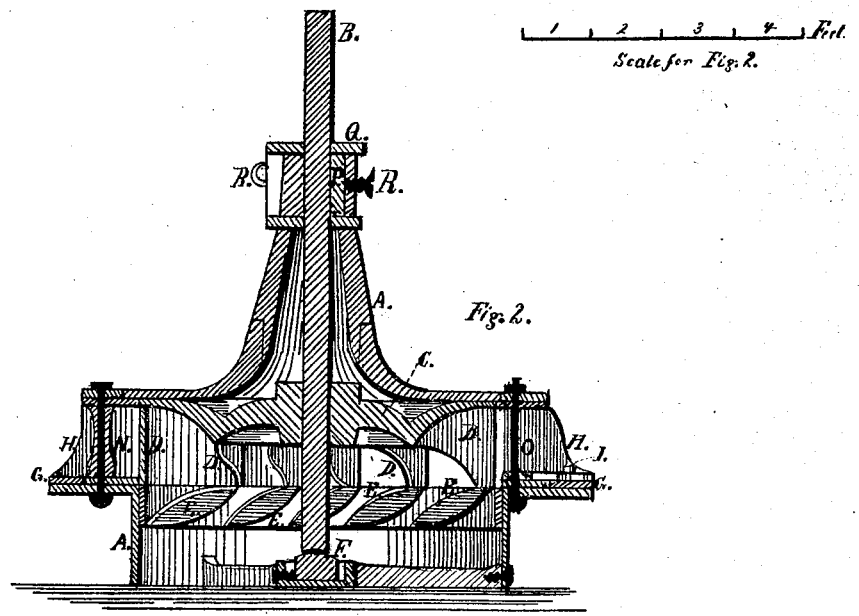
Witnesses.
Inventor.

UNITED STATES PATENT OFFICE.

HENRY SHEARS, OF MERTON, WISCONSIN.

IMPROVEMENT IN WATER-WHEELS.

Specification forming part of Letters Patent No. 119,477, dated October 3, 1871.

*To all whom it may concern:*

Be it known that I, HENRY SHEARS, of Merton, in the county of Waukesha, in the State of Wisconsin, have invented certain Improvements in Water-Wheels, of which the following is a specification:

My invention is a water-wheel, where the water acts in a direct line with the motion of the wheel, and also turns and reacts, with gates for letting the water onto the wheel operated with a circular ring or plate round the wheel.

Figure 1 is a perspective view of the wheel, and Fig. 2 is a sectional view of my invention in the line $x\ x$, Fig. 1.

A is the outside case of the wheel; B, the shaft of the wheel standing vertically; C, the body of the wheel, fastened on shaft B; D, the direct-acting buckets on the wheels, which receives the force of the water direct; E, buckets turned in the other direction, sloping inward toward the center of the wheel, which, as the water is stopped or partially stopped in its forward motion by buckets D, falls onto these buckets E, and, by a reacting motion, gives velocity to the wheel and is discharged into or toward the center of the wheel; F, the step for shaft B to run on; G, a rim round the outside and lying under the ends of the gates. This rim lies on the lower part of the wheel-case and projects out even with it. H, gates which stand up and are worked on a pin, O, which passes through the upper and lower case of the wheel and through a hole in the ears in each gate, so that as the gate is swung out or in by the rim each gate swings on these pins and is opened or closed, as the case may be; I, pin in the rim G, with a head on it. There is a pin of this description which passes through a slot in the outer end of each gate, so as rim G is turned the gates are opened or closed, as the case may be. K, shaft, with which the rim is moved and the gates opened or closed; L, pinion on shaft K; M, cogged segment on rim G, meshing into pinion L; N, bolts or standards with shoulders on both ends, so that the upper and lower part of the case through which these pins pass cannot come any nearer together than the shoulders, with nuts on their ends to hold the upper and lower case together; O, pins from the upper to the lower case, and on which the gates swing; P, box-blocks, which steady the shaft B; Q, top ring of the box, which holds blocks P in position; R, set-screws, which hold the blocks P up to the shaft B; S, pins or bolts, which hold the top Q down. This arrangement is common to most upright shafts and serves to keep the shaft steady.

The operation of this machine is very simple. It is set in a flume with a hole under its bottom for the water to pass out of. The shaft K is turned, which, by means of the pinion L meshing into segment M, turns rim G, and, as the rim moves the pins I, in the slots in the gates, swings the outer ends of the gates out, and the water passes through the opening made and strikes first the direct-acting buckets D, which starts the wheel in motion, and the water then falling on the buckets E reacts and adds force to the wheel, and thus gives both motion and power. To stop the motion, turn the shaft K in the opposite direction, the gates are closed, and the wheel stops.

I claim as my invention—

1. Wheel C, direct-acting buckets D, and reacting buckets E, operating substantially as described.

2. Rim G, gates H, pins I, and pins O, operating substantially as described.

HENRY SHEARS.

Witnesses:
J. B. SMITH,
B. L. CORSS.

(118)